S. MILLS & J. R. McIRVIN.
WHEELWRIGHT'S MACHINE.
No. 66,163. Patented June 25, 1867.
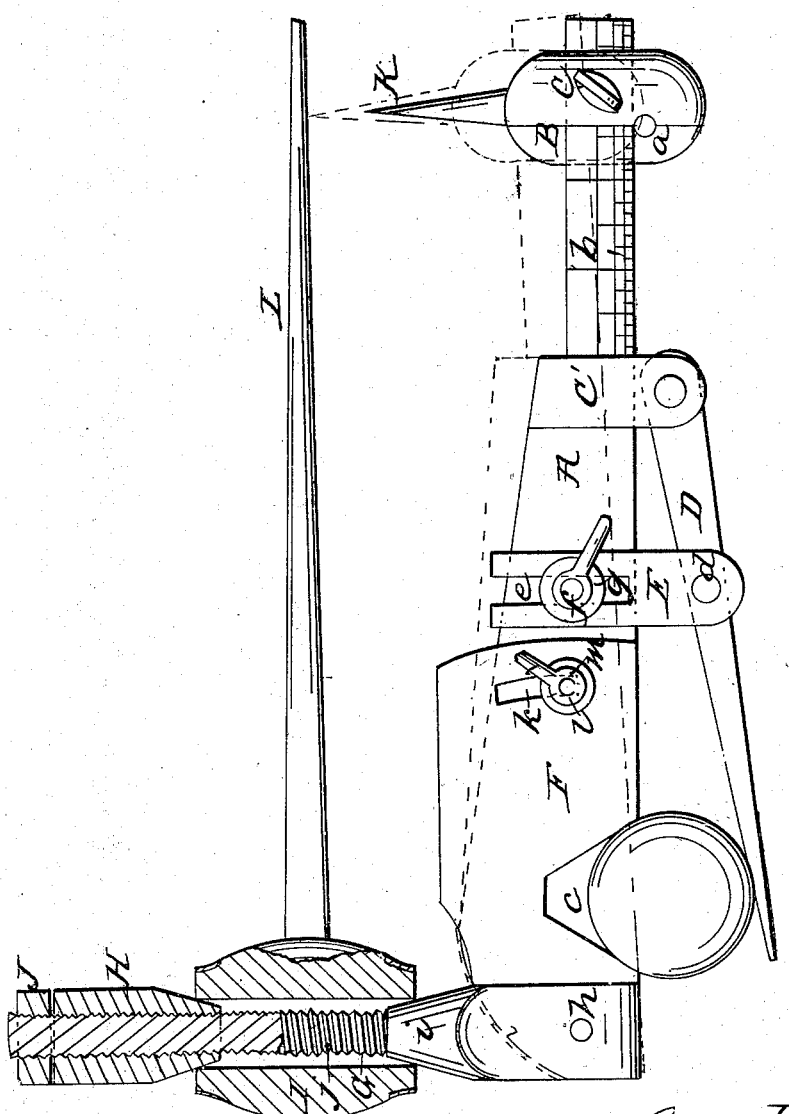

United States Patent Office

SAMUEL MILLS AND J. R. McIRVIN, OF CLINTON, ILLINOIS, ASSIGNOR TO JAMES J. ROBINSON, OF SAME PLACE.

Letters Patent No. 66,163, dated June 25, 1867.

IMPROVEMENT IN WHEELWRIGHTS' MACHINES.

The Schedule referred to in these Letters Patent and making part of the same.

TO ALL WHOM IT MAY CONCERN:

Be it known that we, SAMUEL MILLS and J. R. McIRVIN, of Clinton, in the county of De Witt, and State of Illinois, have invented a new and improved Tram and Self-Centring Dish-Staff; and we do hereby declare that the following is a full, clear, and exact description thereof, which will enable those skilled in the art to make and use the same, reference being had to the accompanying drawings, forming part of this specification.

The drawing represents a face view of our invention partly in section.

This invention relates to a new and useful implement or device for centring hubs and scribing the circumference of wheels, which implement we term a tram and self-centring dish-staff, and by which wheels of any desired size may be scribed precisely from the centre of the hub, and the exact dish given a wheel as may be desired.

A represents what may be termed the stock of the implement, the same consisting of a flat bar having a slide, B, fitted upon it, which may be set or secured at any desired point by means of a set-screw, C. This slide B has a pin, $a$, fitted in it to serve as a marker, and the portion of the stock on which the slide B is fitted and works is graduated, as shown at $b$, said graduation indicating, as the slide B is moved either in or out upon the stock, the length of the spoke to be cut. The stock A, near the end opposite to that where the slide B works, has a V-shaped notch, $c$, made in it, and to the stock A there is secured at right angles a bar, C', which projects beyond the edge of the stock in which the notch $c$ is made, and has an arm, D, secured to it by a pivot, $d$. This arm D extends beyond the notch $c$, and has a bar, E, attached to it by a screw, $d$, said bar being slotted longitudinally at its outer part, as shown at $e$, and through this slot $e$ a screw, $f$, on the stock A passes, said screw having a nut, $g$, upon it, by screwing up which the bar E and arm D may be held at any desired point within the scope of their movement.

The parts above described comprise the centring and scribing apparatus. The hub shown in red is placed in the notch $c$, and the arm D is adjusted in contact with the hub and held by screwing up the nut $g$. By turning the stock A the point or pin $a$ of slide B will scribe a circle concentric with the hub, whatever the size or diameter of the hub may be, and the exact size or circumference of any wheel having any sized hub may be scribed with the greatest facility.

The dishing apparatus is composed of the following parts: To the stock A there is attached by a pivot, $h$, a plate, F, and to this plate there is secured at right angles an arm, G, the inner part $i$ of which is of conical form, the other part being cylindrical, and having a screw, $j$, cut upon it to receive a conical collar, H, provided with an internal screw-thread to work on screw $j$. The hub I of the wheel to be dished is fitted on the arm G, the conical part $i$ of which enters one end of the hub, and the collar H is screwed into the opposite end and secured by a nut, J. The hub by this means is centered on the arm G. The plate F, near its inner end, has a segment or curved slot, $k$, made in it, through which a screw, $l$, on the stock A passes, and a nut, $m$, is fitted on the screw $l$. The plate F or stock A may be adjusted so as to give a greater or less degree of obliquity to the arm G and hub I, as desired, and said parts secured by screwing up the nut $m$. The giving of the arm and hub an oblique position determines the dish of the wheel, and a pointer, K, is attached to the slide to serve as a guide or gauge, and by which every spoke L may be driven into the hub at the correct angle therewith to suit the gauge desired. This device is designed for driving spokes into old hubs.

Having thus described our invention, what we claim as new, and desire to secure by Letters Patent, is—

The stock A, with the notch $c$, adjustable arm D, and graduated end $b$, slide B, provided with pin $a$, and pointer K, arm G, and slotted plate F, arranged to operate substantially as herein set forth and for the purpose specified.

SAMUEL MILLS,
J. R. McIRVIN.

Witnesses:
G. W. KNADLER,
A. H. C. BARBER.